March 28, 1944.   C. G. STRANDLUND   2,345,015
LEVER
Filed June 17, 1940
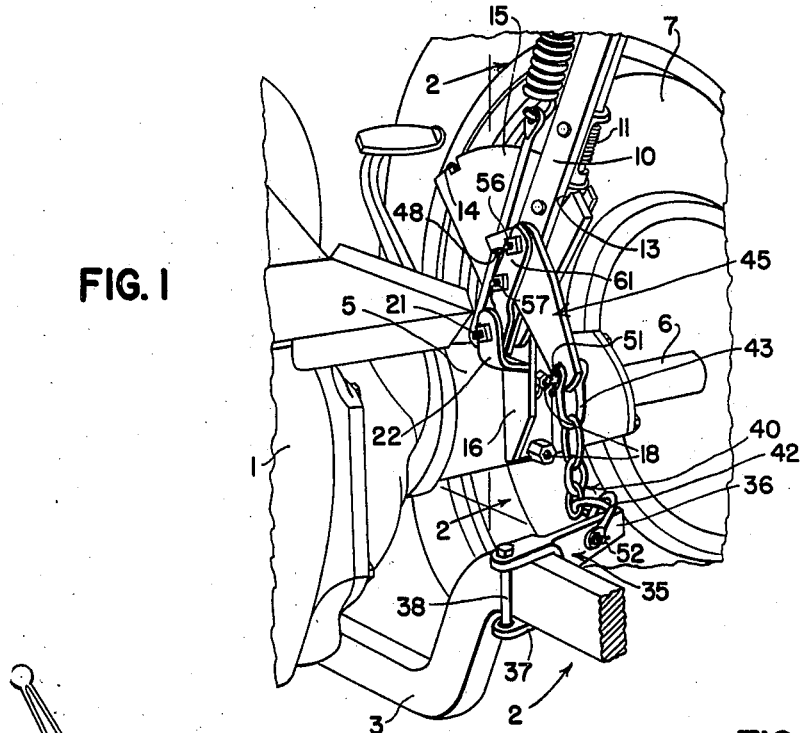
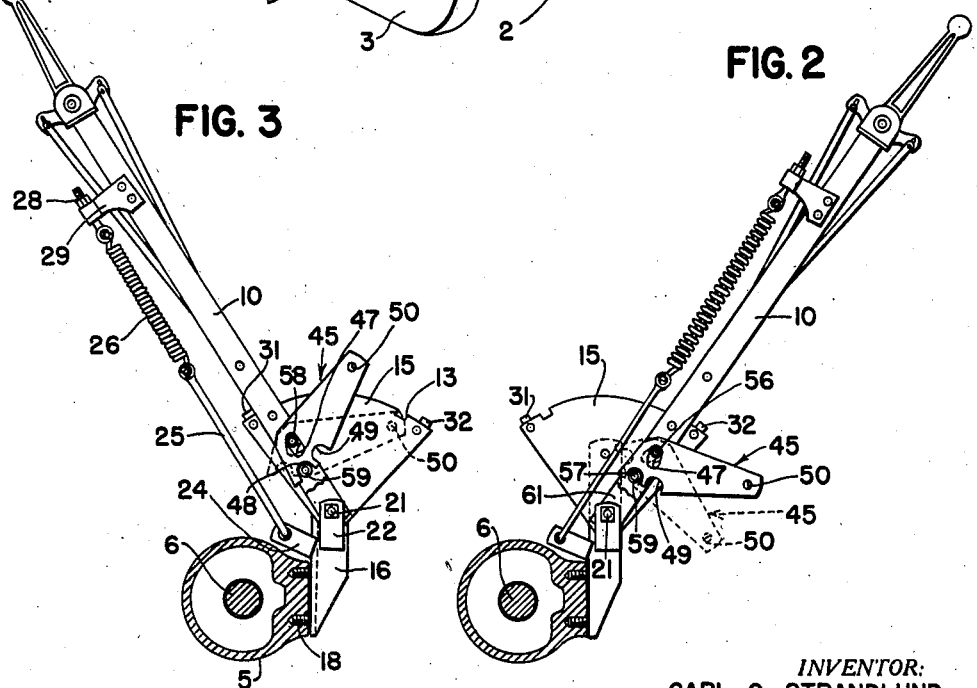
INVENTOR:
CARL G. STRANDLUND
ATTORNEYS.

Patented Mar. 28, 1944

2,345,015

UNITED STATES PATENT OFFICE 2,345,015

LEVER

Carl G. Strandlund, Moline, Ill., assignor to Deere & Company, Moline, Ill., a corporation of Illinois Application June 17, 1940, Serial No. 340,926

8 Claims. (Cl. 97—243)

The present invention relates generally to agricultural machines and is more particularly concerned with improved lifting means particularly adapted, but not necessarily limited to, integrally mounted tractor plows or the like.

The object and general nature of the present invention resides in the provision of an adjustable lifting mechanism of the manually actuated type, wherein provision is made for lifting the plow beam or other tool different heights, and in which the change from one lifting height to the other may be readily accomplished. More specifically, it is a feature of this invention to provide an adjustable lifting connection whereby the plow or other tool may be lifted by swinging a hand lever from one position to the other, but the plow is adapted to be lifted through a relatively small amount but which is ample for turning at the ends of the field. Further, the lifting connections are such that, when desired, the same amount of movement of the manual lever causes a greater lifting movement of the plow, thus providing a high lift which is desirable when transporting the outfit from one field to the other or to some other location.

It is particularly a feature of this invention to provide means for changing the effective lever arm of the lifting lever, easily and quickly and from the seat of the tractor. Another feature of this invention is the provision of improved lifting connections therein when the hand lever is in a lowered or operating position, the lifting connections may be optionally disposed in a position providing for relative vertical movement of the tool beam relative to the tractor or other supporting means, or the lifting connections may be arranged so that the tool is raised throughout the full swinging movement of the hand lever.

These and other objects and advantages of the present invention will be apparent to those skilled in the art after a consideration of the following detailed description, taken in conjunction with the accompanying drawing.

In the drawing:

Figure 1 is a fragmentary rear perspective view of an integrally mounted tractor plow in which the principles of the present invention have been embodied;

Figure 2 is a sectional view taken generally along the line 2—2 of Figure 1, showing the manually controlled lifting member in its lowered position and also showing two positions of the adjustable arm; and Figure 3 is a view similar to Figure 2, showing the position of the lifting lever when the tool is raised.

Referring now more particularly to Figure 1, the agricultural implement in which the present invention has been incorporated includes a tractor 1 and a plow, indicated in its entirety by the reference numeral 2 and including a plow beam or tool beam 3 pivotally connected with the tractor at its forward end. The tractor 1 includes the usual rear axle housing 5, axle shafts 6 and rear wheels 7, the tool beam 3 extending forwardly of the tractor underneath the rear axle 5.

The lifting connections for raising and lowering the tool beam 3 include a manually controlled lever 10 provided with conventional latch mechanism adapted to engage in either a rear notch 13 or a forward notch 14 in a sector 15 fastened rigidly to the tractor 1 in any suitable manner, as by being secured to an attaching angle 16 which is bolted, as at 18, to the rear axle housing 5. The hand lever 10 is pivotally mounted by a bolt 21 on the upper end of the bracket 16, the latter having an extension 22 serving to receive the pivot bolt 21. A forwardly extending bracket 24 is fixed to the attaching bracket 16 and receives the lower end of a link 25, the upper end of which is connected to a spring 26. The latter is adjustably connected, as at 28, to a bracket 29 fixed to the upper or outer end of the hand lever 10. The purpose of the spring 26 and associated parts is to aid in raising the tool beam 3. Stops 31 and 32 are fixed to the forward and rear edges of the sector 15 so as to positively limit the swinging movement of the hand lever 10, as will be clear from Figures 2 and 3.

A bracket 35 is clamped to the tool beam 3, as best shown in Figure 1. The bracket 35 includes an apertured arm 36 and a yoke clip 37, the ends of which are apertured to receive a clamping bolt 38 which, when tightened, secures the bracket 35 in place, as shown in Figure 1. A flexible lifting element 40, preferably in the form of a chain, is connected by a clevis 42 to the arm 36, and at the upper end a similar clevis 43 connects the chain to an adjustable arm, indicated in its entirety by the reference numeral 45. This arm, as best shown in Figures 2 and 3, is provided with a slot 47 and a pair of notches 48 and 49 adjacent to one end of the arm 45, the other end of the latter being apertured, as at 50, to receive the pin 51 by which the clevis 43 is connected therewith. A similar pin 52 passes into the lower clevis 42 to the plow beam bracket arm 36. A pair of bolts 56 and 57 are carried in radially spaced relation by the hand lever 10 and are provided with bushings 58 and 59. The bolt 56 passes through the slot 47 in the arm 45, and both bolts receive the upper end of a hammer strap 61 (Figure 1) which has its inner end bent laterally and apertured to receive the pivot bolt 21 upon which the hand lever 10 is mounted. The slot 47 is of sufficient length to permit the arm 45 to be shifted relative to the bolt 56 and its bushing into a position to dispose either of the notches 48 and 49 about the other bolt 57. The bushings about the bolts 56 and 57 protect them from wear.

The operation is substantially as follows:

For normal plowing, the arm 45 will be disposed with the notch 49 about the bolt 57, which is the position shown in Figure 1. As best shown in dotted lines in Figure 2, this disposes the end 50 fairly close to the pivot axis 21 of the hand lever 10. Also, in this position the point 50 is well below the position it would occupy if, as shown in full lines in Figure 2, the notch 48 were engaged about the bolt 57. The lower position of the arm 45 (dotted lines, Figure 2) permits the lifting chains 41 to be slack, as shown in Figure 1. Thus, the tool beam 3 may rise and fall relative to the tractor as the latter passes over uneven ground. When the operator reaches the end of the furrow he shifts the hand lever 10 from the position shown in Figures 1 and 2 to the position shown in Figure 3, with the latch 11 engaging the forward notch 14. Remembering that the arm 45 is in the adjusted position shown in dotted lines in Figures 2 and 3, it will be seen that the point 50, to which the chain 41 is connected, will be raised only a moderate amount after first taking up the slack (see Figure 1) in the chain 41. This is, however, ample for turning at the ends, yet the lifting effort is lightened considerably due to the fact that the plow bottom itself is not raised very much above the level of the ground. However, when transporting the outfit, or in driving across rough ground or along highways, it is necessary to raise the plow bottom a considerable distance above the ground. For this condition, the front notch 48 is used, as shown in full lines in Figures 2 and 3. While the plow is still in lowered position, the operator reaches back and merely lifts the arm 45, shifting the same bodily relative to the bolt 56, far enough to pivot the arm on the bolt 56 and then swing the notch 49 clear of the bolt 57 and engage the notch 48 about the bolt 57. This, as shown in Figure 2, places the point 50 considerably higher than when the notch 49 engages the bolt 57 and, as a matter of fact, takes up substantially all slack in the chain 41. Then, with the arm 49 in the full line position shown in Figure 2, to raise the plow beam to its high lift position, all the operator has to do is to swing the hand lever 10 forwardly to the position shown in Figure 3. As shown in this figure, the point 50 at this time is much higher than the corresponding position of the point when the notch 49 of the arm 45 engages the bolt 57. Since the slack is practically all removed from the chain 41 by shifting the position of the arm 45, the full stroke of the lever 10 is effective to raise the plow to its high lift position. The arm 45 will stay in either position of adjustment without any danger of inadvertently shifting, and the change from one notch to the other is quickly and easily accomplished from the seat of the tractor when the plow is on the ground and the lifting chain slack, no wrenches or other tools being required.

While I have shown and described above the preferred structure in which the principles of the present invention have been incorporated, it is to be understood that my invention is not to be limited to the particular details shown and described, but that, in fact, widely different means may be utilized in the practice of the broader aspects of my invention.

What I claim, therefore, and desire to secure by Letters Patent is:

1. In an agricultural implement, the combination of supporting means, a tool beam movably connected therewith, a lifting member pivotally connected with said supporting means, an arm pivotally connected with said lifting member at a point spaced from the pivot axis thereof and operatively connected with said tool beam, and means fixing said arm to said lifting member in either of two optional positions to vary the position of the outer end of said arm relative to said tool beam and, simultaneously therewith, the effective lever arm with which said lifting member acts to raise said tool beam.

2. An adjustable lifting mechanism for an agricultural implement or the like, comprising a pivotally mounted lever, an arm adapted to be connected to a part to be lifted, there being a pair of spaced notches in said arm, and means on said lever optionally engaged in one or the other of said notches for disposing said arm in either of two positions relative to said lever.

3. An adjustable lifting mechanism for an agricultural implement or the like, comprising a pivotally mounted lever, an arm adapted to be connected to a part to be lifted, said arm having a slot and a pair of notches formed therein, means on said lever and extending through said slot for mounting said arm on said pivotally mounted lever, and a part on the latter adapted to be engaged by one or the other of the notches on said arm so as to dispose the latter in either of two positions relative to said lever.

4. In combination, a first part having a pair of spaced members thereon, an arm having a slot through which one of said members extends, said arm having a pair of notches spaced from said slot in a longitudinal direction such a distance therefrom that either of said notches may be engaged with the other of said members by sliding said arm relative to said first member so as to dispose a desired notch about said other member.

5. In combination, a pivotally mounted part having a pair of radially spaced members thereon, an arm having a slot and a pair of notches, said slot receiving one of said members and providing for bodily movement of said arm relative to said part so as to dispose either of said notches about the other of said radially spaced members, the outer end of said arm being at a greater distance from the pivot axis of said part when one of said notches engages said other member than when the other notch engages said other member.

6. The combination set forth in claim 4, further characterized by a hammer strap connected with said part and fixed thereto at one side of said arm by said radially spaced members, said arm being disposed between said hammer strap and said part.

7. The combination set forth in claim 4, further characterized by said members comprising bolts, and bushings mounted on said bolts.

8. An adjustable lifting mechanism for an agricultural implement or the like, comprising a pivotally mounted lever member, an arm member adapted to be connected at one end with a part to be lifted, means pivotally connecting the other end of said arm member with said lever member at a point spaced from the axis of pivotal mounting of the lever member, there being a pair of spaced openings in one of said members, and means on the other member optionally engaged in one or the other of said openings for disposing said arm member in either of two positions relative to said lever member so as to vary the position of said one end of the lever member relative to both said part to be lifted and the pivot axis of said lever member.

CARL G. STRANDLUND.